US008073893B1

(12) United States Patent  
Crandall et al.

(10) Patent No.: US 8,073,893 B1  
(45) Date of Patent: Dec. 6, 2011

(54) METHOD AND/OR SYSTEM FOR COMPARING CHARACTER EXPRESSIONS

(75) Inventors: Richard Crandall, Portland, OR (US); Karl Schiffmann, Santa Barbara, CA (US)

(73) Assignees: Robert T. Jenkins, Sacramento, CA (US); Virginia T. Jenkins, Sacramento, CA (US)

( * ) Notice: Subject to any disclaimer, the term of this patent is extended or adjusted under 35 U.S.C. 154(b) by 1290 days.

(21) Appl. No.: 11/509,420

(22) Filed: Aug. 23, 2006

Related U.S. Application Data

(60) Provisional application No. 60/711,647, filed on Aug. 25, 2005.

(51) Int. Cl.  
*G06F 7/50* (2006.01)
(52) U.S. Cl. ..................... 708/671; 340/146.2
(58) Field of Classification Search .................. 708/671; 340/146.2  
See application file for complete search history.

(56) References Cited

U.S. PATENT DOCUMENTS

| | | | | |
|---|---|---|---|---|
| 4,053,871 A | * | 10/1977 | Vidalin et al. | 340/146.2 |
| 4,443,860 A | * | 4/1984 | Vidalin | 340/146.2 |
| 4,550,436 A | * | 10/1985 | Freeman et al. | 340/146.2 |
| 4,896,133 A | * | 1/1990 | Methvin et al. | 340/146.2 |
| 5,381,127 A | * | 1/1995 | Khieu | 340/146.2 |
| 5,392,212 A | * | 2/1995 | Geist | 715/236 |
| 5,465,374 A | * | 11/1995 | Dinkjian et al. | 708/212 |
| 5,761,521 A | * | 6/1998 | Chilinski et al. | 340/146.2 |
| 6,141,656 A | | 10/2000 | Ozbutun et al. | |
| 6,279,080 B1 | | 8/2001 | DeRoo | |
| 6,523,056 B1 | * | 2/2003 | Bole et al. | 708/671 |
| 6,745,215 B2 | * | 6/2004 | Bera | 708/671 |

OTHER PUBLICATIONS

Patent Application in co-pending U.S. Appl. No. 11/771,911, filed Jun. 29, 2007, 96 pages, 93 pages.  
Gill, "Machine and Assembly Language Programming of the PDP-11", Publisher: Prentice-Hall, Inc., Chapters 1 and 3, 1978, 19 pages.  
U.S. Appl. No. 11/771,911: Application as filed on Jun. 29, 2007, 94 pages.  
U.S. Appl. No. 11/771,911: Pre-Exam Formalities Notice and Filing Receipt mailed Jul. 23, 2007, 5 pages.  
U.S. Appl. No. 11/771,911: Preliminary Amendment as filed Nov. 6, 2007, 16 pages.  
U.S. Appl. No. 11/771,911: Applicant Response to Pre-Exam Formalities Notice as filed Jan. 24, 2008, 10 pages.  
U.S. Appl. No. 11/771,911: Filing Receipt and Notice to File Corrected Application Papers mailed Feb. 4, 2008, 5 pages.  
U.S. Appl. No. 11/771,911: Petition under 37 C.F.R. 1.57(a) (3), mailed Mar. 3, 2008, 220 pages.  
U.S. Appl. No. 11/771,911: Applicant Response to Pre-Exam Formalities Notice filed Apr. 3, 2008, 11 pages.  
U.S. Appl. No. 11/771,911: Decision on petition under 37 C.F.R. 1.57(a) (3), mailed Jul. 14, 2008, 3 pages.  
U.S. Appl. No. 11/771,911: Updated filing receipt, mailed Jul. 23, 2008, 3 pages.  
U.S. Appl. No. 11/771,911: Non-Final Office Action mailed Aug. 28, 2009, 16 pages.  
U.S. Appl. No. 11/771,911: Non-Final Office Action response filed Dec. 28, 2009, 40 pages.  
U.S. Appl. No. 11/771,911: Final Office Action as mailed Mar. 30, 2010, 15 pages.

(Continued)

*Primary Examiner* — Tan V Mai  
(74) *Attorney, Agent, or Firm* — Berkeley Law and Technology Group, LLP

(57) ABSTRACT

Embodiments of methods, apparatuses, devices and/or systems for manipulating character expressions to determine relationships among such character expressions.

84 Claims, 4 Drawing Sheets

OTHER PUBLICATIONS

U.S. Appl. No. 11/771,911: Amendment After Final filed Jun. 10, 2010, 43 pages.

U.S. Appl. No. 11/771,911: Request for Continued Examination filed Jul. 21, 2010, 45 pages.

* cited by examiner

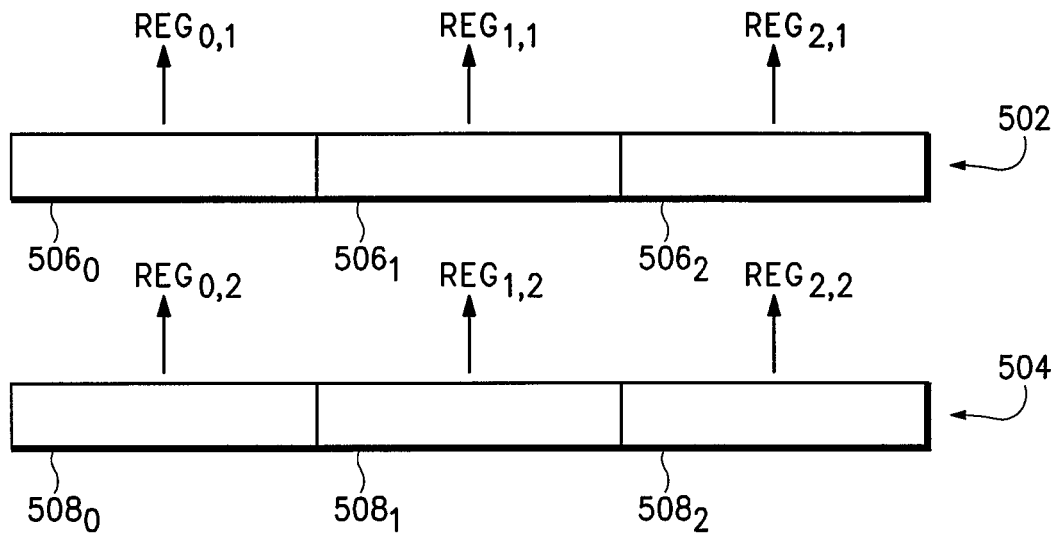
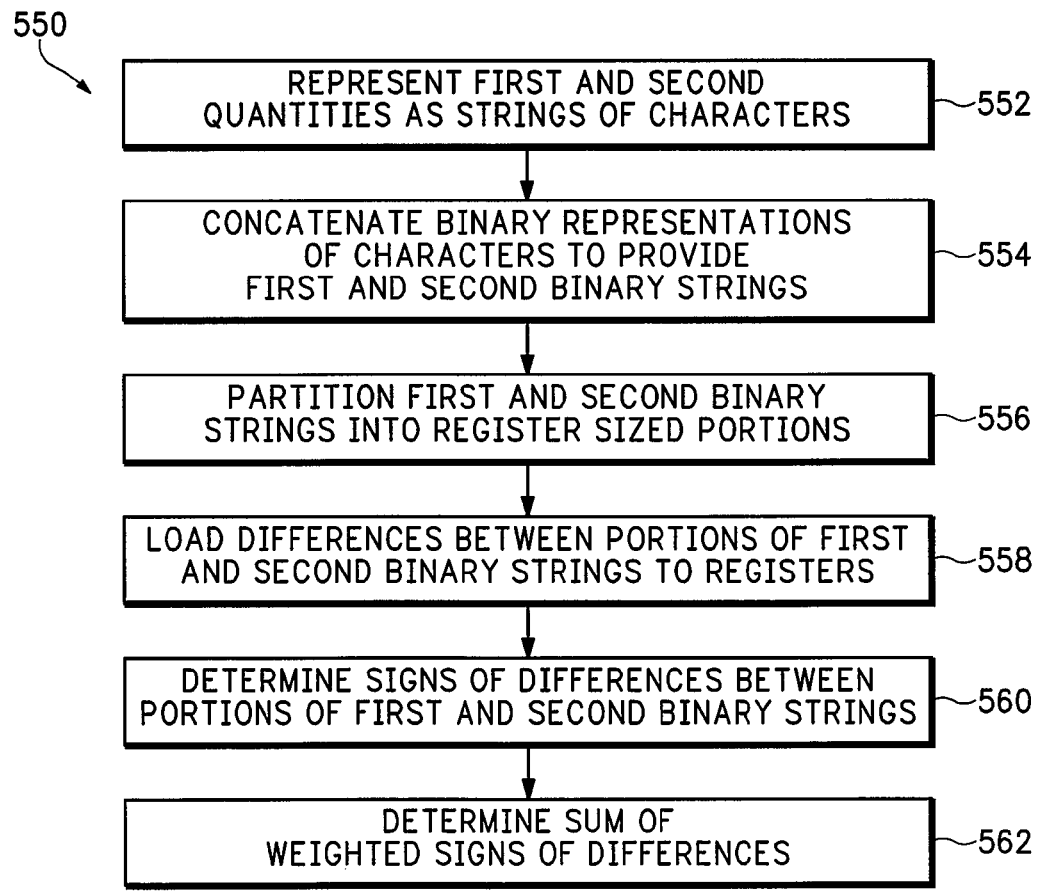
FIG.4
FIG.5

METHOD AND/OR SYSTEM FOR COMPARING CHARACTER EXPRESSIONS

CROSS-REFERENCE TO RELATED APPLICATIONS

This application claims the benefit of U.S. Provisional Application Ser. No. 60/711,647, filed on Aug. 25, 2005.

BACKGROUND

This disclosure is related to determining relationships between and/or among character expressions. Characters, such as alphanumeric characters, are typically used to represent information. In some examples, characters may be used to express words in a spoken and/or written language. In other examples, characters may be used to represent quantities. Computer systems typically represent quantities as binary expressions which may be stored in memory devices. This enables convenient manipulation of quantities using binary arithmetic through execution of computer instructions. Quantities may also be represented in strings of alphanumeric characters. For example, human interfaces typically express quantities in strings of alphanumeric characters. To compare quantities to determine, for example, an existence of an equality and/or inequality between and/or among quantities, a computer system typically expresses the quantities in question as binary expressions, and then compares the binary expressions.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

FIG. 4 is a schematic diagram illustrating an a partitioning of binary strings into register sized portions; and FIG. 5 is a flow diagram illustrating a process to determine a relationship among character strings according to an alternative embodiment.

DETAILED DESCRIPTION

Figure 1:
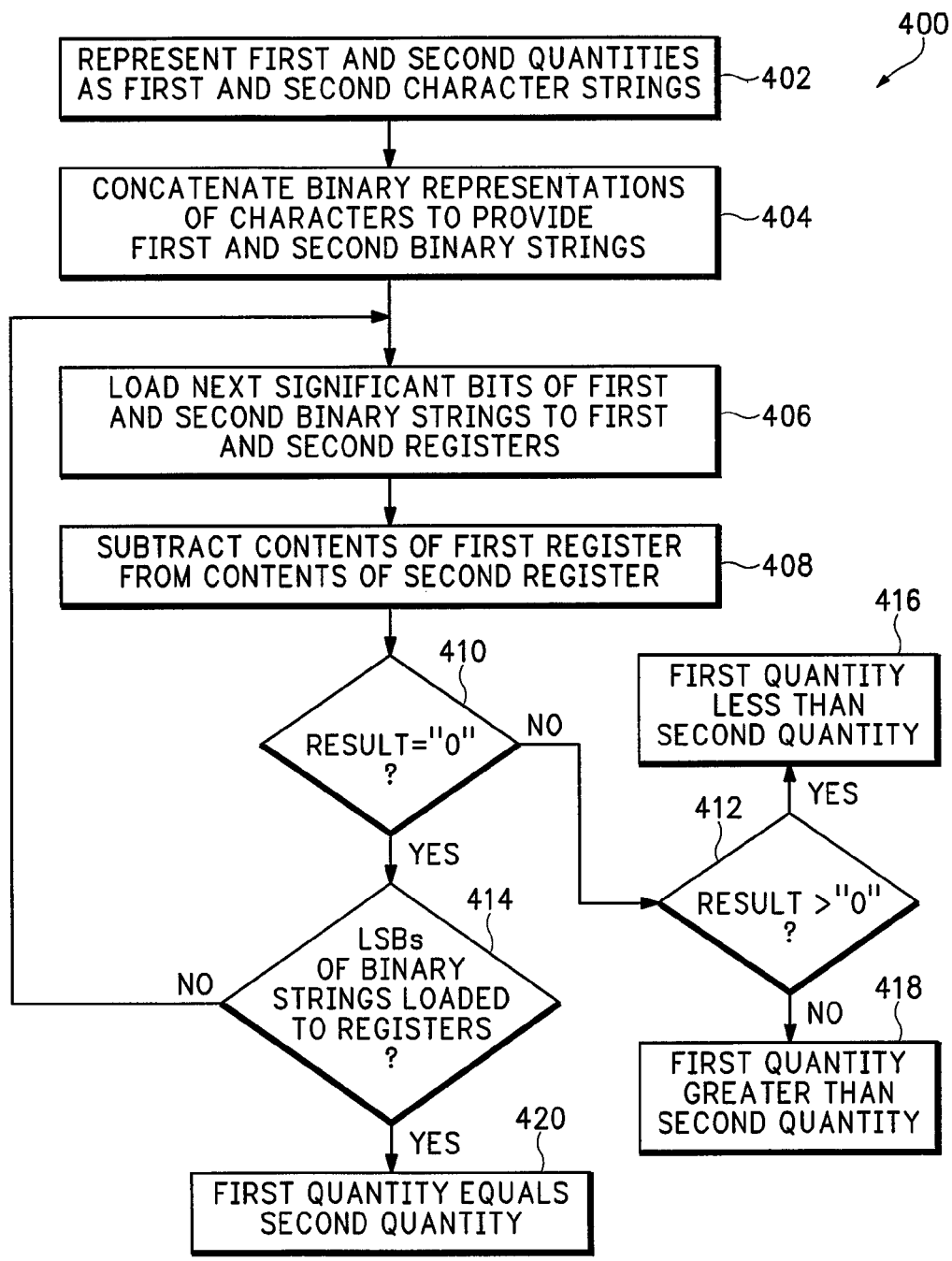
FIG. 1 is a flow diagram illustrating a process to determine a relationship among character strings according to an embodiment.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium and claimed subject matter is not limited in these respects.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "loading", "subtracting", "concatenating", "transforming," "converting," "factoring," enumerating," "representing," "storing," "associating," "substituting," "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices. Such actions and/or processes may be executed by a computing platform under the control of machine-readable instructions stored in a storage medium, for example. Further, unless specifically stated otherwise, processes described herein, with reference to flow diagrams or otherwise, may also be executed and/or controlled, in whole or in part, by such a computing platform.

A "character" as referred to herein relates to a symbol capable of being expressed in a medium. In a particular context, according to an embodiment, one or more characters may be arranged in a particular manner to express a particular meaning as a "character expression." For example, an arrangement of characters, such as a concatenation of characters in one particular embodiment, may be used to express words in a particular spoken and/or written language. As explained below, such words formed according to the English language, in a particular example, may comprise "alphanumeric characters" selected from an alphabet of such characters. Also, an arrangement of characters may provide a mathematical expression such as numerals and/or equations. However, these are merely examples of character expressions and claimed subject matter is not limited in these respects.

According to an embodiment, a "string" as referred to herein comprises an array of symbols arranged in a single linear dimension. In particular examples, symbols in a string may be associated with particular positions in the string relating to, for example, a linear ordering of symbols. A string may comprise one or more of different types of symbols. In another particular example, an alphanumeric string or string of alphanumeric characters may comprise a linear array of alphanumeric characters (e.g., "0", "1", "2", "3", "a", "A", "b", "B", etc.) defined according to a character alphabet. In one particular example, such a character alphabet may comprise characters that are visually distinct and recognizable. In a particular context, and as illustrated below, an alphanumeric string may comprise a character expression to express particular meaning such as, for example, a mathematical expression. However, it should be understood that such a character string is merely one example of a character expressions and that character expressions may comprise different arrangements of characters without departing from claimed subject matter.

In yet another particular example, a "binary string" may comprise a linear array of symbols as bits representing "1" or "0". It should be understood, however, that these are merely examples of strings, and the types of symbols that may represented in a string, and claimed subject matter is not limited in these respects.

According to an embodiment, although claimed subject matter is not limited in these respects, a string of alphanumeric characters may be used to express a quantity such as according to particular formats for representing quantities such as, for example integer, and floating and/or fixed decimal point formats. Here, for example, an alphanumeric string may comprise a concatenation of alphanumeric characters selected from among "0," "1," "2," "3," "4," "5," "6," "7," "8," and/or "9" to express a quantity as a base ten or base eight expression in such an integer or floating and/or fixed decimal point format, for example. In a floating decimal point format, for example, one or more alphanumeric characters may be used to indicate a location for a decimal point among digits in the floating point expression. In another embodiment, a string of alphanumeric characters may be used to express one or more words in a spoken language (e.g., English, Spanish, French, Russian, Greek, Japanese, etc.). However, these are merely examples of how a character string may form a character expression and claimed subject matter is not limited in these respects.

According, to an embodiment, and as illustrated below, a binary string may represent a character and/or string of characters according to an association of characters and binary strings. In another embodiment, a binary string may comprise a concatenation of symbols selected from "1" and/or "0" to express a quantity as a binary expression (e.g., as a 2's-complement expression as illustrated below, for example). However, these are merely examples of how binary strings may be used in binary expressions and claimed subject matter is not limited in these respects.

According to an embodiment, it may be desirable to determine a relationship between and/or among character expressions. For example, determining such relationships may be particularly beneficial in processing information expressed in character strings by a computing platform. Here, in a particular example, a first character expression may comprise a first character string and a second character may comprise a second character string. Binary expressions associated with individual characters in the first and second character strings may be concatenated to form respective first and second binary strings. A relationship between and/or among the character strings may then be determined, at least in part, on the first and second binary strings. However, this is merely an example embodiment and claimed subject matter is not limited in this respect.

In a particular embodiment, although claimed subject matter is not limited in this respect, first and second character strings may express respective first and second quantities. A first binary string may comprise a concatenation of binary expressions associated with individual characters in the first character string and a second binary string may comprise a concatenation of binary expressions associated with individual characters of the second binary string. A "quantitative relationship" between the first and second quantities may then be determined, at least in part, on the first and second binary strings. Here, for example, such a quantitative relationship may comprise an equality and/or inequality relationship between and/or among the first and second quantities expressed as character strings. However, these are merely examples of quantitative relationships that may be determined between and/or among quantities and claimed subject matter is not limited in this respect. In a particular embodiment, although claimed subject matter is not limited in this respect, first and second quantities may be expressed as respective first and second strings of alphanumeric characters. Again, however, this is merely an example of a particular embodiment and claimed subject matter is not limited in these respects.

According to an embodiment, although claimed subject matter is not limited in these respects, a character expression may be expressed as a "fixed length" string comprising a finite number of symbols arranged in a linear ordering. Here, for example, a fixed length string comprising a linear ordering of three symbols may represent a positive quantity of up to nine hundred ninety-nine as a base ten integer expression comprising alphanumeric characters "0," "1," "2," "3," "4," "5," "6," "7," "8," and/or "9". For representing positive quantities less than one hundred as a base ten integer expression, however, less than three symbols may be needed to express the positive quantity. For instance, the positive quantity of thirty-nine may be expressed as "039". Here, a first or left most symbol comprises a character "0" as "padding" since the base ten expression for the positive thirty-nine uses only two characters in the fixed length string. It should also be observed that the base ten expression "039" for the quantity thirty-nine is also "right justified" in that a least significant character "9" takes the right most position in the fixed length string.

It should be understood that right justification and left padding provide conventions to illustrate a location of information in a character and/or binary string. In the particular illustrated embodiment, such a right justified and zero padded expression provides a least significant character and/or bit in a right most position of a string, and padding of "0"s in positions of the string to the left of positions containing information. However, such a right justification and left padding may also apply to a transposition of such a string where a leftmost string position is swapped with a rightmost string position, and an order of string positions is maintained in reverse order from right to left. Under such a transposition, a least significant bit and/or character may exist in a left most position of a string and padding of "0"s may exist in string locations to the right of information in the string. Nevertheless, such a transposition may also said to be right justified and left padded.

In alternative embodiments, a fixed length string may represent values "1" and "0" at bit locations in a fixed length binary string. Here, for example, such a fixed length string may be defined by a word format in a computer platform (e.g., fixed length words of 16-bit, 32-bit, 64-bit, 128-bit and/or the like). As illustrated below, such a word format may define a format of a fixed length binary string to be stored, held and/or represented in a register of a computing platform. Here, such a register to store a fixed number of bits as a fixed length binary string may comprise a "fixed length register."

As pointed out above, a binary expression may represent a quantity. Such binary strings may be used to represent a quantity in any one of several formats. In one particular example, a binary string may represent a quantity in an "unsigned" format as follows:

$$b_n \ldots b_1 b_0 = \sum_{i=0}^{n} b_i * 2^i \quad (1)$$

where $b_i$ comprises a bit value of bit position i expressed as a "1" or a "0."

According to an embodiment, a first binary expression may be "added" to a second binary expression to provide a resulting, third binary expression. In a particular embodiment where the first and second binary expressions represent respective first and second quantities, for example, such third binary expression may represent a "sum" of the first and quantities. According to an embodiment, although claimed subject matter is not limited in this respect, an addition operation, represented here as the symbol "+," may add binary expressions to provide a sum as follows:

$$b_n \ldots b_1 b_0 = d_n \ldots d_1 d_0 + e_n \ldots e_1 e_0.$$

Such an addition operation may determine digits $b_i$ in a resulting sum by, beginning with a least significant digit, determining bit a value of corresponding digit as follows:

$b_i=0$ if $d_i=0$ and $e_i=0$;
$b_i=0$ if $d_i=1$ and $e_i=1$, (where a value of "1" is carried to be combined with $d_{i+1}$ and $e_{i+1}$ in determining $b_{i+1}$ for i+1 less than or equal to n); and
$b_i=1$ if $d_i=0$ and $e_i=1$ or $d_i=1$ and $e_i=0$.

It should be understood, however, that this is merely an example of how binary expressions may be added to provide a sum of two binary expressions and claimed subject matter is not limited in these respects.

According to an embodiment, a first binary expression may be "subtracted" from a second binary expression to provide a resulting, third binary expression. In a particular embodiment where the first and second binary expressions represent respective first and second quantities, for example, such third binary expression may represent a "difference" between the first and quantities. In one particular embodiment of a format of a binary expression, a binary expression may represent a quantity in a "2's-complement" format having a format outlined as follows:

a. fixed length binary string;
b. a most significant bit (MSB) comprises a sign bit;
c. information other than a sign bit is expressed in right justified bit positions; and
d. bit positions between MSB and bit positions containing other information are padded with "0"s.

Here, an MSB (e.g., left most bit) in the fixed binary strings comprises a "sign bit." In one particular embodiment, an MSB of "0" indicates a non-negative quantity while an MSB of "1" indicates a negative quantity. If the MSB and/or sign bit of a 2's-complement binary expression comprises a "0", indicating a non-negative quantity according to the presently illustrated embodiment, the remaining bits in the expression may represent a quantity as illustrated above in the unsigned binary expression illustrated above in relation (1). In one particular example, such a 2's-complement binary expression may comprise a set 16-bit word size. Here, for example, a positive quantity "1607" expressed as a base ten integer may be expressed as a 16-bit word as "0 000 011 001 000 111." Since "1607" comprises a positive quantity, the most significant bit of its 2's-complement binary expression (e.g., in a leftmost position in the 16-bit word in this particular example) comprises "0."

If the MSB and/or sign bit of a 2's complement binary expression comprises a "1", indicating a negative quantity according to the presently illustrated embodiment, the remaining bits in the expression may represent a negative quantity based, at least in part, on an inversion of the remaining bits. Here, a negative quantity –N may be expressed using a 2's-complement form by, according to a particular embodiment, first obtaining a 2's-complement binary expression (or unsigned binary expression as illustrated above in relation (1), for example) of the positive quantity N. Second, a "1's-complement" of the binary expression of positive quantity N, ~N, may be obtained by replacing bit values of "1" with "0" and replacing bit values of "0" with "1". Third, a bit value of "1" is added to ~N to provide the 2's-complement expression of –N, while ignoring any carry from a most significant bit.

According to an embodiment, although claimed subject matter is not limited in these respects, the subtraction of a first quantity from a second quantity may be expressed as an addition of a negative of the first quantity to the second quantity, providing a third quantity as a difference between the first and second quantities. Here, the first and second quantities may be expressed as 2's-complement binary expressions. A 2's-complement expression of the negative of the first quantity may be obtained as illustrated above. Then, the 2's-complement expression of the second quantity may be added to the 2's-complement of the expression of the negative of the first quantity to provide a 2's-complement expression of a result of subtracting the first quantity from the second quantity. However, this is merely an example of how a result from a subtraction of a first quantity from a second quantity may be expressed and claimed subject matter is not limited in these respects.

According to an embodiment, although claimed subject matter is not limited in this respect, if a third quantity resulting from a subtraction of first quantity from a second quantity yields a negative quantity, the first quantity may be deemed to be "greater than" the second quantity. Also, if such a quantity resulting from a subtraction of a first quantity from a second quantity yields a positive quantity, the first quantity may be deemed to be "less than" the second quantity. In a particular example where first and second quantities are represented as 2's-complement binary expressions, if a most significant bit of a 2's-complement third quantity comprises "1" (indicating a negative quantity), the first quantity may be deemed greater than the first quantity. Similarly, if the most significant big of the 2's-complement third quantity comprises "0" (indicating a positive or zero quantity), the first quantity may be deemed to be "less than or equal to" the second quantity.

According to an embodiment, as pointed out above, a quantity may be expressed as a string of alphanumeric characters. In one particular example, such an alphanumeric string may comprise a concatenation of individual alphanumeric characters selected from "0," "1," "2," "3," "4," "5," "6," "7," "8," and/or "9." Using these alphanumeric characters, according to a particular embodiment, such a concatenation of individual characters may comprise a base ten expression of a quantity. Such a base ten expression of an integer or fixed and/or floating decimal point numeral may be formulated according to relation (2) as follows:

$$c_n \ldots c_1 c_0 = \sum_{i=0}^{n} c_i * 10^i \qquad (2)$$

where $c_i$ comprises a value of a character at position i in a string of concatenated alphanumeric characters selected from "0," "1," "2," "3," "4," "5," "6," "7," "8," and/or "9."

Using these alphanumeric characters, according to an alternative embodiment, such a concatenation of individual characters "0," "1," "2," "3," "4," "5," "6," and/or "7" may comprise a base eight and/or octal expression of a quantity. Such a base eight and/or octal expression of an integer or fixed and/or floating decimal point numeral may be formulated according to relation (3) as follows:

$$c_n \ldots c_1 c_0 = \sum_{i=0}^{n} c_i * 8^i \qquad (3)$$

where $c_i$ comprises a value of a character at position i in a string of concatenated alphanumeric characters selected from "0," "1," "2," "3," "4," "5," "6," and/or "7." It should be understood that such base eight and base ten expressions are merely examples of expressing quantities as strings of alphanumeric characters and that claimed subject matter is not limited in this respect.

According to an embodiment, although claimed subject matter is not limited in these respects, an alphanumeric character may be represented as a numeric code. Here, an alphanumeric character may be represented as a value according to an association of alphanumeric characters to values. In one particular example, characters may be associated with values according to the acronym for the American Standard Code for Information Interchange (ASCII). An ASCII code may be used for associating individual characters with integer values 0 to 127. Table 1 illustrates an association of the alphanumeric characters "0," "1," "2," "3," "4," "5," "6," "7," "8," and/or "9" with numeric values according to ASCII.

TABLE 1

| Alphanumeric Character | ASCII Code (In Octal) | 8-Bit Byte Representation of ASCII code |
|---|---|---|
| 0 | 060 | 00 110 000 |
| 1 | 061 | 00 110 001 |
| 2 | 062 | 00 110 010 |
| 3 | 063 | 00 110 011 |
| 4 | 064 | 00 110 100 |
| 5 | 065 | 00 110 101 |
| 6 | 066 | 00 110 110 |
| 7 | 067 | 00 110 111 |
| 8 | 070 | 00 111 000 |
| 9 | 071 | 00 111 001 |

According to a particular embodiment, an ASCII code may represent an alphanumeric character as an 8-bit byte comprising a string of binary bits. In alternative embodiments, ASCII may represent an alphanumeric character as a 7-bit byte. Such a 7-bit ASCII code may translate an 8-bit ASCII code by including a single "0" padding in the MSB of a 7-bit code. Here, an 8-bit byte binary expression associated with an alphanumeric character, such as an ASCII code, may also represent a value and/or quantity as illustrated above in relation (1). Such values and/or quantities may also be ordered according to alphanumeric characters that they represent. In one particular example, alphanumeric character "4" represents a value and/or quantity that is greater than a value and/or quantity represented by alphanumeric character "2." Likewise, the binary string associated with "4" according to ASCII, "0 110 100", represents a value and/or quantity that is greater than the value and/or quantity represented by the binary string associated with "2" according to ASCII, "0 110 010." Similarly, alphanumeric character "9" represents a value and/or quantity that is greater than a value and/or quantity represented by alphanumeric character "5." Likewise, the binary string associated with "9" according to ASCII, "0 111 001", represents a value and/or quantity that is greater than the value and/or quantity represented by the binary string associated with "5" according to ASCII, "0 110 101." Accordingly, the binary representations of alphanumeric characters "0," "1," "2," "3," "4," "5," "6," "7," "8," and/or "9" according to ASCII represents at least a partial ordering of an ordered sequence of these characters according to relation (4) as follows:

$$c_k > c_j \text{ if and only if } d_k > d_j \qquad (4)$$

where:
$c_k$ is a value and/or quantity represented by an alphanumeric character k selected from among "0," "1," "2," "3," "4," "5," "6," "7," "8," and/or "9";
$c_j$ is a value and/or quantity represented by an alphanumeric character j selected from among "0," "1," "2," "3," "4," "5," "6," "7," "8," and/or "9";
$d_k$ is a value and/or quantity of a binary string representing alphanumeric character k according to ASCII; and
$d_j$ is a value and/or quantity of a binary string representing alphanumeric character j according to ASCII.

It should be understood, however, that this is merely an example of how binary representations of characters may form at least a partial ordering of an ordered sequence such characters, and claimed subject matter is not limited in these respects. For example, one or more portions of associated character codes and/or binary expressions set forth by the American National Standards Institute (ANSI) may similarly provide such a partial ordering of an ordered sequence of characters represented by the portions of character codes and/or binary expressions. It should also be understood that other character codes and/or binary expressions may be associated with international characters used to represent characters other than Arabic numerals and/or English letters (e.g., Greek, Russian, Japanese, Chinese, and/or the like).

While Table 1 illustrates an association between binary expressions and alphanumeric characters comprising numerals, such an association may also represent other alphanumeric characters with binary expressions. Here, for example, binary expressions may also be associated with characters that are used to form words for a spoken and/or written language. Table 2 below illustrates an association of such characters according to ASCII.

TABLE 2

| Alphanumeric Character | ASCII Code (In Octal) | 8-Bit Byte Representation of ASCII code |
|---|---|---|
| A | 101 | 01 000 001 |
| B | 102 | 01 000 010 |
| C | 103 | 01 000 011 |
| ... | ... | ... |
| ... | ... | ... |
| X | 130 | 01 011 000 |
| Y | 131 | 01 011 001 |
| Z | 132 | 01 011 010 |
| a | 141 | 01 100 001 |
| b | 142 | 01 100 010 |
| c | 143 | 01 100 011 |
| ... | ... | ... |
| x | 170 | 01 111 000 |
| y | 171 | 01 111 001 |
| z | 172 | 01 111 010 |

The alphanumeric characters listed in Table 2 provide an example of alphanumeric characters that may be concatenated in a string to express a word according to a spoken and/or written language. However, such works are merely examples of character expressions that maybe formed from a concatenation of such characters and claimed subject matter is not limited in these respects. As illustrated in Table 2, these alphanumeric characters may also be associated with binary expressions according to the aforementioned association between alphanumeric characters and binary expressions in ASCII. It should be observed that characters "A" through "Z" and "a" through "z" define particular orderings of ordered sequences of characters in an English language alphabet. Further, upper case characters "A" through "Z" are associated with binary expressions "01 000 001" through "01 011 010" (e.g., associated "101 through "132" in octal), respectively. Similarly, lower case characters "a" through "z" are associated with binary expressions "01 100 001" through "01 111 010" (e.g., associated with "141" through "172" in octal), respectively. Accordingly, binary expressions associated with upper case characters "A" through "Z" form a partial ordering of binary expressions associated with an ordered sequence of such characters. Here, in this particular embodiment, binary expressions representing characters have the following property where $\alpha$ and $\beta$ represent characters both selected from either "A" through "Z" or from "a" through "z" as follows:

$c_\alpha > c_\beta$ if and only if $\beta$ precedes $\alpha$ in an associated alphabet of characters "A" through "Z" or "a" through "z" where $c_\alpha$ is a value and/or quantity associated with an unsigned binary expression associated with $\alpha$ and $c_\beta$ is a value and/or quantity associated with an unsigned binary expression associated with $\beta$.

As illustrated above with reference to relations (2) and (3), alphanumeric characters may be concatenated in a string to provide a base ten or base eight representation of a quantity and/or value. Such expressions may be further represented as a string of bits comprising a concatenation of binary representations of individual alphanumeric characters in the base ten expression. In one particular example, although claimed subject matter is not limited in this respect, a base ten expression of "1907" may comprise a concatenation of alphanumeric characters "1", "9", "0" and "7." This alphanumeric characters may be individually represented by binary strings "0 110 001", "0 111 001", "0 110 000" and "0 110 111", respectively, according to the association of alphanumeric characters and binary strings of Table 1. Accordingly, the value of the base ten expression "1907" may be represented as a concatenation of the individual binary strings representing alphanumeric characters "1", "9", "0" and "7" to provide a 32-bit binary string "00 110 001 00 111 001 00 110 000 00 110 111."

Similarly, alphanumeric characters concatenated to form words of a spoken and/or written language. For example, according to a particular embodiment, characters "c", "a" and "t" may be concatenated to form the word "cat" and the characters "d", "o" and "g" may be concatenated to form the word "dog." Like base eight and/or base ten expressions of quantities, the word "cat" may be represented as a concatenation of the individual binary strings representing characters "c", "a" and "t" to provide a 24-bit binary string "01 100 011 01 100 010 01 110 100". Similarly, the word "dog" may be represented as a concatenation of individual binary strings representing characters "d", "o" and "g" to provide a 24-bit binary string "01 100 100 01 101 111 01 100 111."

According to an embodiment, a relationship between first and second character expressions may be determined based, at least part, on a subtraction of a first binary string representing the first character expression from a second binary string representing a second character expression. In one particular example, first and second character expressions may express quantities and a result of such a subtraction may indicate a quantitative relationship between the first and second quantities. In one particular embodiment, although claimed subject matter is not limited in this respect, a first quantity expressed as an alphanumeric character string may be determined to greater than a second quantity expressed as an alphanumeric character string based, at least in part, on a result of subtracting a first binary string from a second binary string. Here, such a first binary string may comprise a concatenation of binary representations of individual alphanumeric characters in the first character string while the second binary string may comprise a concatenation of binary representations of individual alphanumeric characters in the second character string. In another particular example, first and second words defined according to a spoken and/or written language may be expressed as strings of alphanumeric characters. A first binary string may comprise a concatenation of binary expressions representing characters in the first word while a second binary string may comprise a concatenation of binary expressions representing characters in the second word. Here, in a particular example, a result of subtracting the first binary string from the second binary string may determine an alphabetic ordering of the first and second words. However, these are merely examples of how a result from a subtraction of a first binary string from a second binary string may be indicative of a relationship between first and second character strings represented by the first and second binary strings, and claimed subject matter is not limited in these respects.

FIGS. 1 through 5 illustrate particular embodiments of determining a relationship between first and second character expressions based, at least in part, on binary strings comprising concatenations of binary expressions representing characters in the first and second character expressions. In the particular illustrated examples, first and second alphanumeric character strings represent respective first and second quantities (e.g., in a base ten or base eight format) and binary expressions associated with individual characters in the alphanumeric character strings are concatenated to form first and second binary strings. A quantitative relationship between the first and second quantities is determined, at least in part on a subtraction of at least a portion of the first binary string from a portion of the second binary string. It should be understood, however, that this is merely an example embodiment directed to determining a quantitative relationship between quantities represented by character strings and that the techniques described may be generally applied to binary strings representing other types of character expressions.

Without belaboring the discussion, these techniques may be used to determine a relationship between first and second character strings comprising words in a written and/or spoken language in other particular embodiments. As noted above, such words may be represented by binary strings representing a concatenation of binary expressions representing individual characters in the character strings. At least a portion of the first string may be subtracted from at least a portion of the second string to determine a relationship between the first and second words (e.g., an alphabetic ordering). Again, this is merely just an example embodiment and the techniques described herein may be applied to determining different relationships between and/or among different types of character expressions.

According to an embodiment, although claimed subject matter is not limited in this respect, a quantity may be expressed as an alphanumeric character string comprising a fixed number of alphanumeric characters. In one example, such an alphanumeric character string may be right justified, and left padded with the alphanumeric character "0". To express a quantity 1234 (e.g., one thousand, two hundred thirty four), for example, a twenty-four character string may read as follows:

"000000000000000000001234".

A computer and/or machine may access "registers" defined in a storage medium capable of storing, holding and/or representing information. In one example, fixed length registers of a computer and/or machine may be defined to be a fixed size such as, for example, two, four or eight bytes where a byte comprises eight bits. In another example, portions of a register may be accessible by a computer instruction based, at least in part, on an address and/or identifier associated with the register. A register may comprise a hardware addressable memory location in a so-called hardware register. Alternatively, a register may comprise a software defined memory location in a system memory of a computer platform where such a register is not necessarily limited to a specific addressable hardware location. However, these are merely examples of a register and claimed subject matter is not limited in these respects.

FIG. 1 is a flow diagram illustrating a process embodiment 400 to determine a quantitative relationship between first and second quantities. In particular, process embodiment 400 may determine whether a first quantity is greater than, less than or equal to a second quantity. According to an embodiment, first and second quantities may be represented as strings of alphanumeric characters at block 402. In one particular embodiment, although claimed subject matter is not limited in these respects, such strings of alphanumeric characters may comprise alphanumeric characters "0," "1," "2," "3," "4," "5," "6," "7," "8," and/or "9". Further, such strings of alphanumeric characters may also represent the first and second quantities as quantitative expressions (e.g., base ten expressions or base eight expressions) in fixed length expressions which are right justified and left padded with the character "0" as illustrated above. Accordingly, such alphanumeric character strings may comprise the same number of characters. However, these are merely examples of how strings of alphanumeric characters may be used to express quantities and claimed subject matter is not limited in these respects.

According to an embodiment, characters in the alphanumeric character strings representing the first and second quantities may be associated with binary representations as illustrated above with reference to Table 1. In a particular example, such individual alphanumeric characters are associated with binary representations according to ASCII. Block 404 may concatenate binary representations of individual alphanumeric characters of alphanumeric strings representing the first and second quantities.

Figure 2:
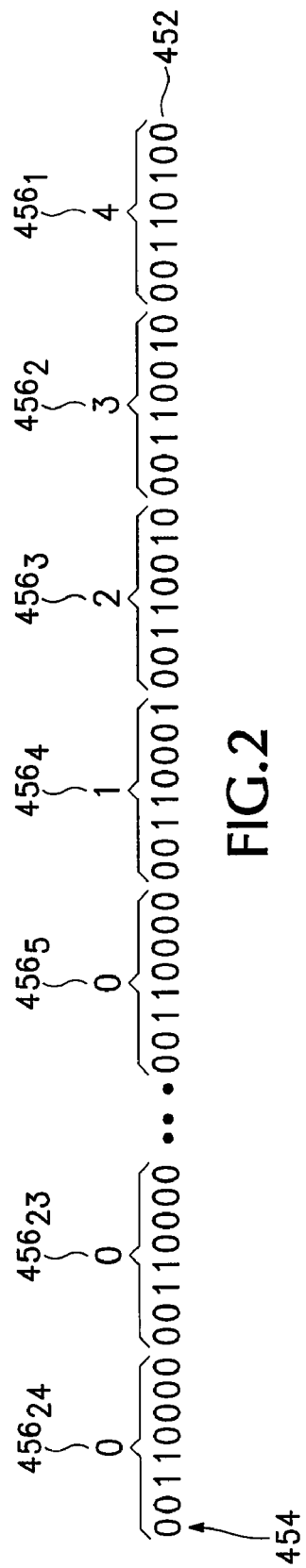
FIG. 2 is a schematic diagram illustrating a concatenation of binary representations of alphanumeric characters in a binary string according to an embodiment.
Figure 3:
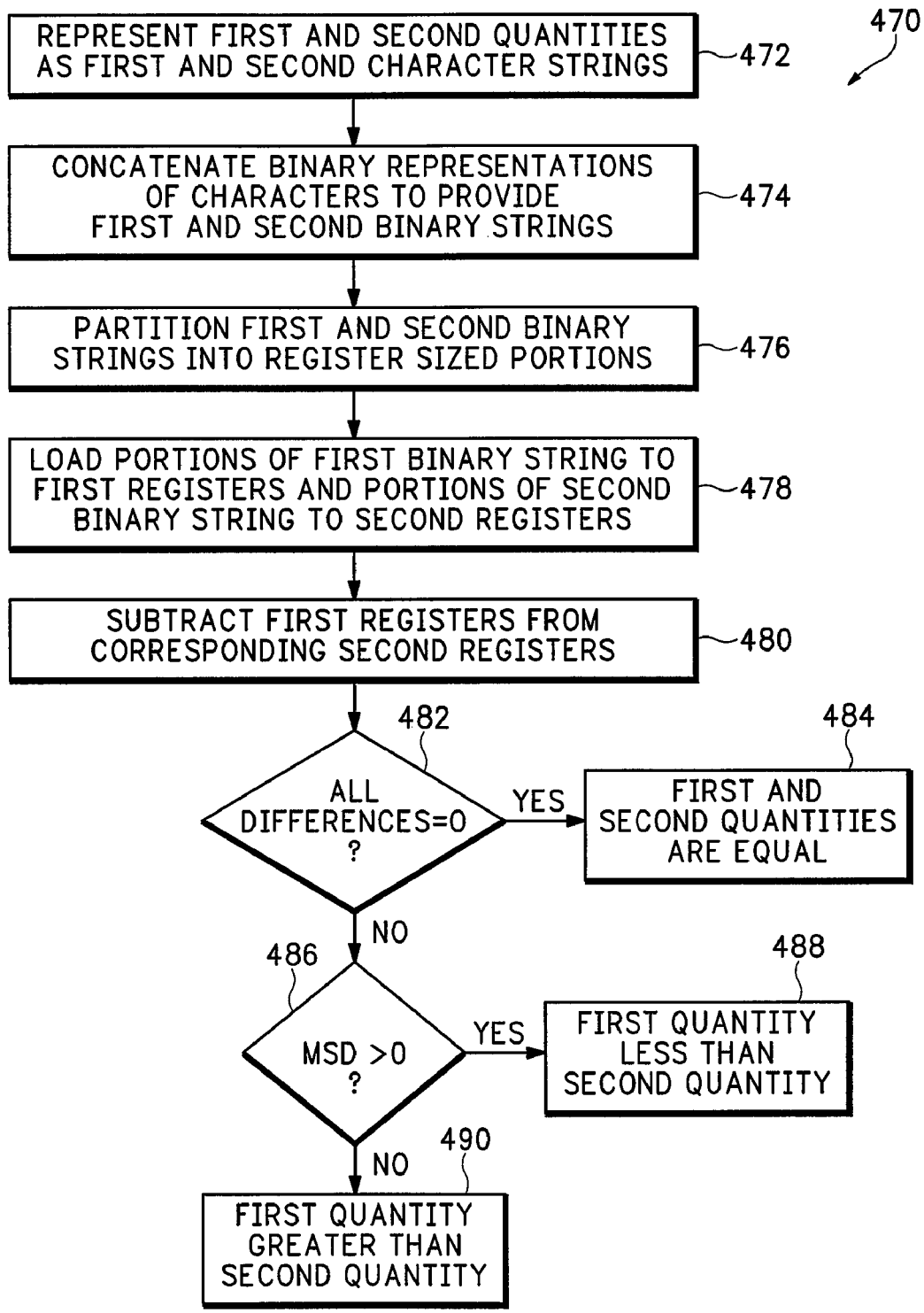
FIG. 3 is a flow diagram illustrating a process to determine a relationship among character strings according to an alternative embodiment.

FIG. 2 illustrates a concatenation of binary representations of alphanumeric characters 456 in an alphanumeric character string according to an embodiment block 404. Block 404 may concatenate binary representations of alphanumeric characters in alphanumeric character strings representing first and second quantities as illustrated in FIG. 2. Referring again to the example of expressing a quantity of one thousand, two hundred thirty four as a twenty-four character string ("000000000000000000001234"), an individual alphanumeric character 456 may be associated with a binary representation according to an association between alphanumeric characters and binary strings. In particular, for example, the alphanumeric character "0" is associated with the binary expression "00110000". Here, twenty such binary expressions "00110000" are concatenated together in binary string 452 to represent twenty alphanumeric characters $456_5$ through $456_{24}$ ("0") used as padding in the alphanumeric character string. Additionally, binary expressions "00110001", "00110010", "00110011" and "00110100" are concatenated together from left to right in binary string 452 to represent alphanumeric characters $456_1$ through $456_4$ ("1234"). As illustrated with reference to FIG. 2, accordingly, block 404 may create a first binary string from a concatenation of binary expressions representing a first alphanumeric character string (representing the first quantity) and a second binary string from a concatenation of binary expressions representing a second alphanumeric character string (representing the second quantity). Where the alphanumeric character strings representing the first and second quantities comprise the same number of characters and each character is represented by an 8-bit byte, according to a particular embodiment, resulting first and second binary strings comprise the same number of bits.

As illustrated below, portions of first and second binary strings determined at block 404 may be loaded to registers and manipulated to determine a quantitative relationship between first and second quantities. In one particular embodiment, although claimed subject matter is not limited in this respect, a register may be capable of holding, storing and/or representing a fixed number of bits in a linear array of bits. As will be illustrated throughout the remainder of this discussion for the purpose of illustrating a particular embodiment, a register may be capable of holding, storing and/or representing sixty-four bits. It should be understood, however, that this is merely an example of a size of a register that may be used to hold, store and/or represent a linear array of bits and that other sizes (e.g., 16-bit, 32-bit, 128-bit, etc.) may be used in other embodiments.

Referring again to a concatenation of binary representations of twenty four characters in an alphanumeric character string of FIG. 2, binary string 452 comprises 192 bits beginning with a most significant portion leading with byte "00110000" to represent alphanumeric character "0" and ending with a least significant portion trailing with byte "00110100" to represent alphanumeric character "4". Here, a 64-bit register is capable of holding, storing and/or representing a third of the 192 bits of binary string 452 at any one time. Blocks 406 and 408 may perform register operations on portions of the first and second binary strings determined at block 404 beginning with the most significant bits of the respective first and second binary strings.

According to an embodiment, although claimed subject matter is not limited in these respects, a computing platform may address individual locations of memory at a byte (e.g., 8-bits) level. That is, a byte may represent the smallest unit of memory which may be addressed by a computer program and/or compiler. Accordingly, individual bytes in memory may be addressed by a computer program and/or compiler. In one embodiment, a computing platform may adhere to a "big endian" processing architecture for organizing a binary string retrieved from a memory and stored in a register in which a byte at a lowest memory address of the string is loaded to a most significant byte position in the register and a byte at a highest memory address of the string is loaded to a least significant byte position in the register. In a particular embodiment, a computing platform may store binary string 452 in a contiguous memory with character $456_{24}$ at a lowest byte address of binary string 452 and store the binary expression corresponding with character $456_1$ at the highest byte address of binary string 452. Here, such a computing platform comprising a big endian processing architecture may retrieve a contiguous portion of binary string 452 and store the retrieved portion in a register such that the most significant byte portion of the register stores a byte of the contiguous portion of binary string 452 in a lowest address in memory for binary string 452. In another embodiment, a computing platform may adhere to a "little endian" processing architecture for organizing a binary string retrieved from memory and stored in a register in which a byte at a highest memory address of the string is loaded to a most significant byte position in the register and a byte at a lowest memory address of the string is loaded to a least significant byte position in the register. Here, such a computing platform comprising a little endian processing architecture may retrieve a contiguous portion of binary string 452 and store the retrieved portion in a register such that the most significant byte portion of the register stores the a byte in binary string at a highest byte level memory of the retrieved portion of the contiguous portion of binary string 452.

In a first iteration of the loop set forth by block 406 through diamond 414, block 406 may load a portion of the first binary string comprising its most significant bits to a first register, $Reg_1$, and load a portion of the second binary string comprising its most significant bits to a second register, $Reg_2$. In subsequent iterations of the loop set forth by block 406 through diamond 414, according to a particular embodiment, block 406 may load next most significant bits of the first and second binary strings to $Reg_1$ and $Reg_2$, respectively. In a particular example wherein first and second binary strings each comprise 192 bits, and $Reg_1$ and $Reg_2$ comprise 64-bit registers, block 406 may load one third of the first and second binary strings to $Reg_2$ and $Reg_2$ per iteration.

According to an embodiment, although claimed subject matter is not limited in this respect, block 408 may subtract contents of $Reg_1$ from contents of and $Reg_2$. Here, the contents of $Reg_1$ and $Reg_2$ may be treated as quantities expressed in a 2's-complement form. Accordingly, the contents $Reg_1$ may be subtracted from the contents $Reg_2$ by adding a 2's-complement expression for the negative of the contents of $Reg_1$ to the contents of $Reg_2$. However, this is merely an example of how a portion of a first binary string may be subtracted from a portion of a second binary string, and claimed subject matter is not limited in this respect.

If a result of the subtraction at block 408 is a zero quantity as determined at diamond 410, the contents of $Reg_1$ and $Reg_2$ may be determined to be equal. Here, at least in terms of portions of the first and second binary strings evaluated in iterations of block 406 through diamond 410 in iterations of block 406 through diamond 414 thus far, the first and second quantities represented in alphanumeric character strings are equal. If all bits of the first and second binary strings have been loaded to registers and evaluated as determined at diamond 414, the first and second quantities may be determined to be equal at block 420. If the least significant bits (LSBs) of the first and second binary strings have not been loaded to registers and processed at blocks 406 and 408, process 400 may return to block 406 to load the next most significant bits of the first and second binary strings to $Reg_1$ and $Reg_2$. Here, the next most significant bits of the first and second binary strings may comprise the most significant bits of the portions of the first and second binary strings that are yet unprocessed at blocks 406 and 408.

Process 400 may be executed, at least in part, by computing platforms employing either a big endian processing architecture or a little endian processing architecture. In particular embodiments employing a big endian processing architecture, block 406 may merely copy register sized portions of a first and second binary strings stored in memory. In particular embodiments employing a little endian processing architecture, block 406 may retrieve register sized portions of the first and second binary strings and then transpose bytes in the retrieved portions before loading to registers. Here, with such a little endian processing architecture, a most significant byte portion of the retrieved portion of a binary string may be swapped with a least significant byte portion of the retrieved portion before loading to a register. Other bytes of the retrieved portion may be similarly transposed to provide in the register a reverse ordering of bytes in the retrieved portion. However, these are merely examples of how a computing platform using either a big endian or little endian processing architecture may retrieve portions of a binary string from memory and load the retrieved portions to registers, and claimed subject matter is not limited in these respects.

It should be noted that, in the particular illustrated embodiment, a binary expression associated with a character comprises an 8-bit byte with a zero value in a most significant bit position. Since a register in particular embodiments illustrated herein stores an integer number of bytes, such a resister storing a portion of a binary string formed from a concatenation of such binary expressions comprises a zero value in its most significant bit. Accordingly, such register sized portions of such a binary string may express a non-negative quantity in a 2's-complement form.

If a result of subtraction at block 408 does not equal zero as determined at diamond 410, the first and second quantities may be determined to be not equal. Accordingly, if such a result of subtraction at block 408 is greater than zero, the first quantity may be determined to be less than the second quantity. Otherwise, if such a result of subtraction at block 408 is not greater than zero as determined at diamond 412, the first quantity may be determined to be greater than the second quantity.

Process 400 illustrates sequential iterations of loading of portions first and second binary strings to registers, and then subtracting contents of registers where an execution of an iteration may be conditioned on a result of an execution of a previous iteration. In an alternative embodiment illustrated in FIG. 3, portions of a first binary string may be loaded to a plurality of corresponding registers while portions of a second binary string may be loaded to a plurality of different corresponding registers. Here, blocks 472 and 474 may provide first and second binary strings based, at least in part, on first and second alphanumeric strings as illustrated above with reference to blocks 402 and 404 of process 400. Block 476 may partition first and second binary strings into register sized portions. Block 478 may load register sized portions of the first string to first registers and register sized portions of the second string to second registers.

As shown in FIG. 4, for example, a first binary string 502 may be partitioned into register sized portions 506 while a second binary string 504 may be partitioned into register sized portions 508. Here, portion $506_0$ may comprise the most significant portion of first binary string 502 (e.g., the portion of first binary string 502 comprising the most significant bits of the binary string 502) while portion $506_2$ may comprise the least significant portion of first binary string 502 (e.g., the portion of first binary string 502 comprising the least significant bits of the binary string 502). Portions $506_0$, $506_1$ and $506_2$ are loaded to corresponding first registers $Reg_{0,1}$, $Reg_{1,1}$ and $Reg_{2,1}$, respectively. Similarly, portion $508_0$ may comprise the most significant portion of second binary string 504 while portion $508_2$ may comprise the least significant portion of second binary string 504. Portions $508_0$, $508_1$ and $508_2$ are loaded to corresponding first registers $Reg_{0,2}$, $Reg_{1,2}$ and $Reg_{2,2}$, respectively. Accordingly, registers $Reg_{2,1}$ and $Reg_{2,2}$ store least significant portions of first binary string 502 and second binary string 504, respectively, while registers $Reg_{0,1}$ and $Reg_{0,2}$ store most significant portions of first binary string 502 and second binary string 504, respectively.

As illustrated above in connection with process 400, process 470 may similarly be executed, at least in part, by a computing platform employing either a big endian or little endian processing architecture. In a particular embodiment employing a big endian processing architecture, block 478 may load bytes of portions 506 and 508 to registers in the same order as retrieved from strings 502 and 504 from memory. In a particular embodiment employing a little endian processing architecture, block 478 may transpose bytes within portions 506 and 508 as retrieved from byte addresses in strings 502 and 504 in memory before loading to registers as illustrated above and maintaining the same order of bits within bytes transposed with portions 506 and 508. However, these are merely particular examples of how block 478 may be executed by a computing platform employing either a big endian or a little endian processing architecture and claimed subject matter is not limited in this respect.

Following loading of portions 506 and 508 to registers at block 478 as illustrated above, block 480 may then subtract portions 506 of first binary string 502 from corresponding portions 508 as follows:

$Reg_0 \leftarrow Reg_{0,2} - Reg_{0,1}$ $Reg_1 \leftarrow Reg_{1,2} - Reg_{1,1}$ $Reg_2 \leftarrow Reg_{2,2} - Reg_{2,1}$ Where:

$Reg_{i,1}$ is a register storing an ith register sized portion of the first binary string;

$Reg_{i,2}$ is a register storing an ith register sized portion of the second binary string; and $Reg_i$ is a register storing an ith difference between corresponding register sized portions of the first and second binary strings.

Here, the use of distinct registers $Reg_0$, $Reg_1$ and $Reg_2$ is merely used to illustrate storing a result from a subtraction operation. It should be understood, however, that any of registers $Reg_{0,2}$, $Reg_{0,1}$, $Reg_{1,2}$, $Reg_{1,1}$, $Reg_{2,2}$, and/or $Reg_{2,1}$ may be reused to store a such a result from a subtraction operation. Also, as pointed out above, any of the registers $Reg_0$, $Reg_1$, $Reg_2$ $Reg_{0,2}$, $Reg_{0,1}$, $Reg_{1,2}$, $Reg_{1,1}$, $Reg_{2,2}$ and/or $Reg_{2,1}$ may comprise a hardware addressable memory location in a so-called hardware register or, alternatively, a software defined memory location in a system memory of a computer platform where such a register is not necessarily limited to a specific addressable hardware location.

According to particular embodiment illustrated above, if the contents of registers $Reg_0$, $Reg_1$ and $Reg_2$ all comprise a 2's-complement expression for zero, as determined at diamond 482, the first and second quantities may be deemed equal. Otherwise, the first quantity may be deemed greater than or less than the second quantity based upon a sign of contents in a register $Reg_0$, $Reg_1$ or $Reg_2$ having non-zero contents and corresponding with the most significant portions of the first and second binary strings among registers having non-zero contents. Such a register may comprise a "most significant difference" (MSD) between portions of the first and second binary strings. For example, diamond 486 may determine whether the first quantity is greater or less than the second quantity based, at least in part, on a sign of such an MSD between portions of the first and second binary strings. In an example, as illustrated above, register $Reg_0$ may comprise a difference between most significant bits of respective first and second binary strings. Diamond 486 may determine that the first quantity is less than the second quantity if the contents of register $Reg_0$ comprises a 2's-complement expression of a positive quantity and determine that the first quantity is greater than the second quantity if the contents of register $Reg_0$ comprises a 2's-complement expression of a negative quantity. Otherwise, if contents of register $Reg_0$ comprises a 2's-complement expression of zero, diamond 486 may determine that the first quantity is less than the second quantity if $Reg_1$ comprises a 2's-complement expression of a negative quantity (where register $Reg_1$ therefore stores the MSD) and determine that the first quantity is greater than the second quantity if $Reg_1$ comprises a 2's-complement expression of a positive quantity.

FIG. 5 is a flow diagram illustrating a process embodiment 550 to determine a quantitative relationship between a first and second quantity such as, for example, determining whether a first quantity is greater than, less than or equal to a second quantity, according to an alternative embodiment. Here, block 552 may represent first and second quantities as strings of alphanumeric characters as illustrated above with reference to block 402 of process 400. Also, block 554 may concatenate binary representations of alphanumeric characters to provide first and second binary strings as illustrated above with reference to block 404 of process 400.

As illustrated above with reference to FIG. 1, where the alphanumeric character strings representing the first and second quantities comprise the same number of characters and each character is represented by an 8-bit byte, according to a particular embodiment, resulting first and second binary strings comprise the same number of bits. Block 556 may partition first and second binary strings into portions equaling a number of bits that may be held, stored and/or represented in a register. Again, as illustrated above, such registers may comprise fixed length registers capable of storing, holding and/or representing a fixed number of bits. Accordingly, such a register may store any predetermined number of bits (e.g., 8-bit registers, 16-bit registers, 32-bit registers, 64-bit registers, 128-bit registers and/or the like). In a particular embodiment in which a binary string may comprise 192 bits (as illustrated above with reference to FIG. 2) and registers are capable of storing, holding and/or representing 64 bits, for example, the binary string may be portioned into three 64-bit portions. It should be understood, however, that a 192 bit binary string and 64-bit register are discussed merely for the purpose of illustration and that claimed subject matter is not limited in this respect.

Block 558 may load differences between portions of the first and second binary strings to registers. Here, portions of the first binary string may be subtracted from associated portions of the second binary string with the results loaded to registers. Continuing with the previous example where first and second binary strings comprise 192 bits and a register can hold store and/or represent 64 bits, a first register may be loaded with a difference between most significant 64 bits of the first binary string and most significant 64 bits of the second binary string. Accordingly, a second register may be loaded with a difference between next most significant 64 bits of the first binary string and next most significant 64 bits of the second binary string. A third register may then be loaded with a difference between least significant 64 bits of the first binary string and least significant 64 bits of the second binary string.

According to an embodiment, loading of differences between portions of the first and second binary strings to registers may be referenced as follows:

$Reg_0 \leftarrow BS_2[0] - BS_1[0]$ $Reg_1 \leftarrow BS_2[1] - BS_1[1]$ $Reg_2 \leftarrow BS_2[2] - BS_1[2]$

...

$Reg_n \leftarrow BS_2[n] - BS_1[n]$

Where:
  $BS_1[i]$ is the ith portion of the first binary string containing bits equaling the size of registers; and
  $BS_2[i]$ is the ith portion of the second binary string containing bits equaling the size of registers.

According to a particular embodiment, although claimed subject matter is not limited in this respect, $BS_1[0]$ and $BS_2[0]$ may comprise portions comprising most significant bits of the first and second binary strings. Likewise, $BS_1[n]$ and $BS_2[n]$ may comprise portions comprising least significant bit portions of the first and second binary strings.

As illustrated above in connection with processes 400 and 470, process 550 may similarly be executed, at least in part, by a computing platform employing either a big endian or little endian processing architecture. In a particular embodiment employing a big endian processing architecture, portions $BS_1[i]$ and $BS_2[i]$ may merely comprise portions of the first and second binary strings in the same byte order as retrieved from memory. In a particular embodiment employing a little endian processing architecture, portions $BS_1[i]$ and $BS_2[i]$ may comprise bytes of the first and second binary strings in a byte order reversed according to how these bytes of the first and second strings are addressed in a memory storing the first and second strings.

According to an embodiment, an operator ">>m" may be used to indicate a dyadic and/or binary register operation on contents of an operand register having a result that may be stored in the same or different register. Here, a result of operator ">>m" may comprise shifting contents of an operand register from an MSB position toward an LSB position by m bits and propagating and/or copying a value of a sign bit and/or most significant bit of operand register to the m+1 most significant bits in the resulting register contents. If a most significant bit in a 64-bit register $Reg_x$ is "0" (indicating a 2's-complement expression of a non-negative quantity), for example, the expression $Reg_x >> 63$ may comprise all "0"s to bit locations of a resulting register. According to the aforementioned 2's-complement form of binary expressions, this is an expression of a quantity zero. Similarly, if a most significant bit in $Reg_x$ is "1" (indicating a 2's-complement expression of a negative quantity), for example, the expression $Reg_x >> 63$ may comprise all "1"s in bit locations of a register. According to the aforementioned 2's-complement form of binary expressions, this is an expression of a quantity negative one. Therefore, according to a particular embodiment, the expression $Reg_x >> 63$ may provide a 2's-complement expression for a quantity zero if the contents of $Reg_x$ comprises a 2's-complement expression of zero or greater and may provide a 2's-complement expression for a quantity negative one if the contents of $Reg_x$ comprises a 2's-complement expression of less than zero.

According to an embodiment, although claimed subject matter is no limited in these respects, block 560 may determine a "sign" of the differences between portions of the first and second binary strings loaded to registers at block 558. Such a sign, in this particular embodiment, comprises an indication as to whether the contents of a register comprises a 2's-complement expression for a positive quantity, negative quantity or zero. For example, for the purposes of illustration, where $Reg_i$ comprises m-bit register, the expression $(Reg_i >> (m-1)) - (-Reg_i >> (m-1))$ may provide an indication as to the sign of the contents of $Reg_i$ as a 2's-complement expression. Here, if the contents of $Reg_i$ comprises a positive quantity, the expression $(Reg_i >> (m-1))$ provides a 2's-complement expression for zero, the expression $(-Reg_i >> (m-1))$ provides a 2's-complement expression for negative one and $(Reg_i >> (m-1)) - (-Reg_i >> (m-1))$ provides a 2's-complement expression for positive one. If the contents of $Reg_i$ comprises a negative quantity, the expression $(Reg_i >> (m-1))$ provides a 2's-complement expression for negative one, the expression $(-Reg_i >> (m-1))$ provides a 2's-complement expression for zero and $(Reg_i >> (m-1)) - (-Reg_i >> (m-1))$ provides a 2's-complement expression for negative one. If the contents of $Reg_i$ comprises a zero quantity, the expression $(Reg_i >> (m-1))$ provides a 2's-complement expression for zero, the expression $(-Reg_i >> (m-1))$ provides a 2's-complement expression for zero and $(Reg_i >> (m-1)) - (-Reg_i >> (m-1))$ provides a 2's-complement expression for zero.

As illustrated above, the differences between portions of the first and second binary strings may be stored in m-bit registers $Reg_0$ through $Reg_n$ at block 558. Block 560 may then determine the sign of the differences between the aforementioned portions of the first and second binary strings and update registers $Reg_0$ through $Reg_n$ accordingly as follows:

$Reg_0 \leftarrow (Reg_0 >> (m-1)) - (-Reg_0 >> (m-1))$ $Reg_1 \leftarrow (Reg_1 >> (m-1)) - (-Reg_i >> (m-1))$ $Reg_2 \leftarrow (Reg_2 >> (m-1)) - (-Reg_2 >> (m-1))$

...

$Reg_n \leftarrow (Reg_n >> (m-1)) - (-Reg_n >> (m-1))$

According to an embodiment, an operator "<<m" may be used to indicate a binary and/or dyadic shift operation on contents of an operand register by an m number of bits. Here, bits in an operand register may be shifted in a direction from the LSB toward the MSB (e.g., to the left according to a particular embodiment) by an m number of bits. The m least significant bit positions in the operand register are replaced with "0" and the m most significant bits are discarded. According to a particular embodiment, m may be limited by a number of bits in a register to prevent a shift of the least significant bit to a most significant bit in the resulting shifted expression. Here, such a shift may be limited to no more than the number of bits in a register minus one. Where the contents of a register $Reg_i$ comprise a 2's-complement expression for positive one, the expression $Reg_i<<m$ may provide an expression for a quantity $2^m$ as a 2's-complement expression. Similarly, where the contents of a register $Reg_i$ comprise a 2's-complement expression for negative one, the expression $Reg_i<<m$ may provide an expression for a quantity $-2^m$ as a 2's-complement expression. Lastly, where the contents of a register $Reg_i$ comprise a 2's-complement expression for zero, the expression $Reg_i>>m$ may provide an expression for a zero quantity as a 2's-complement expression.

As illustrated above in connection with a particular embodiment, block 558 may load differences between corresponding register sized portions of first and second binary strings to registers. According to an embodiment, although claimed subject matter is not limited in these respects, block 560 may determine a sign of the difference between respective most significant portions of the first and second binary strings. Block 560 may load the determined sign to $Reg_0$ as a 2's-complement expression for one if the difference is positive, negative one if the difference is negative and zero if the difference is zero. Block 560 may similarly determine a sign of the difference between respective least significant bit portions of the first and second binary strings, and load the determined sign to $Reg_n$ as a 2's-complement expression. Also, block 560 may determine the sign of the differences between bit portions of respective first and second binary strings in decreasing significance in registers $Reg_1$ to $Reg_{n-1}$.

According to an embodiment, block 562 may determine a weighed sum of the signs of differences between portions of first and second binary strings. In a particular example, although claimed subject matter is not limited in these respects, such a weighted sum may be used to determine whether the first quantity is greater than, less than or equal to the second quantity based. The sum of weighted signs of differences may be expressed as a 2's-complement binary expression. Here, if such a sum weighted differences comprises a 2's-complement binary expression for zero, the first and second quantities may be determined to be zero. Likewise, if such a sum comprises a 2's-complement binary expression for a positive number (e.g., MSB="0" and at least one other bit="1"), the second quantity may be determined to be greater than the first quantity. Lastly, if such a sum comprises a 2's-complement binary expression for a negative number (e.g., MSB="1"), the second quantity may be determined to be less than the first quantity.

In a particular embodiment, although claimed subject matter is not limited in these respects, block 562 may determine weighted components the sum of weighted signs of differences between corresponding register sized portions of first and second binary strings by applying the aforementioned shift operator "<<". Where $Reg_0$ stores a sign of difference between the most significant bit portions of the first and second binary strings and $Reg_n$ stores a sign of the difference between the least significant portions of the first and second binary strings, such a sum of weighted signs of differences may be determined as follows:

Sum←($Reg_0$<<n)+($Reg_1$<<(n-1))+($Reg_2$<<(n-2))+ . . . +($Reg_n$<<0)

Accordingly, "Sum" comprises a 2's-complement expression of a quantity and/or value given by the following relation (5):

$$\text{Sum} = \sum_{i=0}^{n} 2^i * Reg_{n-i} \quad (5)$$

Storing a sign of the differences between least significant bit portions of the first and second binary strings, $Reg_n$, provides a component of the sum of weighted signs comprising contents of $Reg_n$ with no net shift from shift operator "<<." Here, such a component of the sum based on the contents of register $Reg_n$ may comprise a 2's-complement expression of a quantity expressed by $Reg_n$ (e.g., zero, one or negative one depending on the sign of the difference between LSB portions of the first and second binary strings) multiplied by $2^0$ or one. On the other hand, register $Reg_0$, storing a sign of the differences between most significant bit portions of the first and second binary strings, provides a component of the sum of weighted signs comprising contents of $Reg_0$ with a net shift of n bits. Here, such a component may comprise a 2's-complement binay expression of $Reg_0$ multiplied by $2^n$.

Computing platforms typically associate data items with particular pre-defined data types such as, for example, text, integer, Boolean, fixed point decimal and floating point decimal data types to name a few. Computing platforms typically represent integer type data items as 2's-complement binary expressions. As such, a magnitude of an integer expressed by a computing platform may be limited by, for example, a programming language and/or a size of a register to store, hold and/or represent the integer as a 2's-complement expression. In connection with techniques such as those described above with reference to FIGS. 1 though 5, however, the size of such an integer data type data item is not necessarily limited by a programming language and/or size of a register. Here, a computing platform may represent an integer type data item as a concatenation of binary expressions representing digits in an integer expression (e.g., digits in a base eight or base ten integer expression). Accordingly, a size of such an integer type data item as represented in a computing platform need not be limited by a particular programming language and/or size of a register. Here, a magnitude of such an integer type data item may only be limited by the availability of memory in a computing platform to store a concatenation of binary expressions of individual digits of such an integer type data item. Such a computing platform may then perform integer operations on such integer type data items for at least determining the aforementioned greater than, less than and/or equal to relationships.

Techniques for performing table look ups are well-known and well-understood. Thus, this will not be discussed in detail here. However, it shall be appreciated that any and all of the previously described and/or later described processing, operations, conversions, transformations, manipulations, etc. of strings, symbols, characters, numerals, data, etc. may be performed on one or more computing platforms or similar computing devices, such as those that may include a memory to store tables although, claimed subject matter is not necessarily limited in scope to this particular approach. Thus, for example, a hierarchy of data may be formed by combining two or more hierarchies of data, such as by applying a previously described embodiment. Likewise, multiple hierarchies of data may be formed by splitting or dividing a particular hierarchy of data, again, such as by applying a previously described embodiment. Likewise, additional operations and/or manipulations of data hierarchies may be performed, such as ordering hierarchies of data and more. It is intended that claimed subject matter cover all such embodiments.

It will, of course, be understood that, although particular embodiments have just been described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method comprising:
   concatenating one or more electrical digital signals representing binary expressions of individual ones of characters of a first character expression in a first binary string, said characters of said first character expression representing a first numerical value of a first numerical expression represented by a concatenation of said individual ones of characters of said first character expression according to a non-binary position-value notation;
   concatenating one or more electrical digital signals representing binary expressions of individual ones of characters of a second character expression in a second binary string, said characters of said second character expression representing a second numerical value of a second numerical expression represented by a concatenation of said individual ones of characters of said second character expression according to said non-binary position-value notation; and
   determining a relationship between said first and second numerical values based, at least in part, on said first and second binary strings.

2. The method of claim 1, wherein said first character expression represents a first quantity and said second character expression represents a second quantity, and wherein said determining said relationship between said first and second character expressions further comprises determining a quantitative relationship between said first and second quantities.

3. The method of claim 2, wherein said determining a relationship between said first and second quantities further comprises determining whether said first quantity is greater than said second quantity based, at least in part, on said first and second binary strings.

4. The method of claim 2, wherein said determining a relationship between said first and second quantities further comprises determining whether said first quantity is equal to said second quantity based, at least in part, on said first and second binary strings.

5. The method of claim 1, wherein said determining said relationship between said first and second numerical values further comprises:
   subtracting at least a portion of said first binary string from at least a portion of said second binary string; and
   determining said relationship based, at least in part, on a result of said subtraction.

6. The method of claim 5, wherein said first character expression represents a first quantity and said second character expression represents a second quantity, and wherein said determining said relationship further comprises determining whether said first quantity is greater than said second quantity based, at least in part, on said result of said subtraction.

7. The method of claim 5, wherein said result of said subtraction comprises a sign bit.

8. The method of claim 5, wherein said subtracting further comprises:
   loading a most significant bits portion of said first binary string to a first register comprising a fixed length register;
   loading a most significant bits portion of said second binary string to a second register comprising a fixed length register; and
   subtracting contents of said first register from contents of said second register.

9. The method of claim 8, and further comprising:
   loading a next most significant bits portion of said first binary string to a third register;
   loading a next most significant bits portion of said second binary string to a fourth register; and
   subtracting contents of said third register from contents of said fourth register.

10. The method of claim 8, and further comprising in response to a result of said subtracting said contents of said first register from said contents of said second register:
    loading a next most significant bits portion of said first binary string to said first register;
    loading a next most significant bits portion of said second binary string to said second register; and
    subtracting contents of said third register from contents of said fourth register.

11. The method of claim 1, and further comprising determining said binary expressions of said characters based, at least in part, on an association of characters and binary expressions.

12. The method of claim 11, wherein said association of characters and binary expressions comprises an association of characters and binary expressions according to ASCII.

13. The method of claim 1, wherein said first and second character expressions comprise first and second character strings that are right justified.

14. The method of claim 13, wherein said first and second character strings are left padded with zeros.

15. The method of claim 1, wherein said binary expressions of said characters comprise eight bit strings selected from a mapping of eight bit strings to characters, said eight bit strings comprising a partial ordering of said strings with respect to an ordering of a sequence of said characters.

16. The method of claim 1, wherein said binary expressions of said characters comprise seven bit strings selected from a mapping of seven bit strings to characters, said seven bit strings comprising a partial ordering of said strings with respect to an ordering of a sequence of said characters.

17. The method of claim 1, wherein said determining said relationship further comprises:
   determining signs of differences between corresponding portions of said first and second binary strings;
   weighting said signs of differences based, at least in part, on a significance of said corresponding portions of said first and second binary strings; and
   determining said relationship based, at least in part, on a sum of the weighted signs of differences.

18. The method of claim 17, wherein said weighting said signs of differences further comprises:
   representing said signs of differences as 2's-complement binary expressions in registers; and
   shifting bits in at least some of said registers.

19. The method of claim 17, wherein said shifting bits in at least some of said registers further comprises shifting said bits by a number of bit positions based, at least in part, on a significance of differences represented in said registers.

20. The method of claim 19, wherein said significance of differences are based, at least in part, on corresponding bit portions in said first and second binary strings.

21. The method of claim 1, wherein said first and second character expressions comprise first and second alphanumeric character strings.

22. An apparatus comprising:
   means, comprising one or more processors, for concatenating binary expressions of individual ones of characters of a first character expression in a first binary string, said characters of said first character expression representing a first numerical value of a first numerical expression represented by a concatenation of said individual ones of characters of said first character expression according to a non-binary position-value notation;
   means, comprising said one or more processors, for concatenating binary expressions of individual ones of characters of a second character expression in a second binary string, said characters of said second character expression representing a second numerical value of a second numerical expression represented by a concatenation of said individual ones of characters of said second character expression according to a non-binary position-value notation; and
   means, comprising said one or more processors, for determining a relationship between said first and second numerical values based, at least in part, on said first and second binary strings.

23. The apparatus of claim 22, wherein said first character expression represents a first quantity and said second character expression represents a second quantity, and wherein said means for determining said relationship between said first and second character expressions further comprises means for determining a quantitative relationship between said first and second quantities.

24. The apparatus of claim 23, wherein said means for determining a relationship between said first and second quantities further comprises means for determining whether said first quantity is greater than said second quantity based, at least in part, on said first and second binary strings.

25. The apparatus of claim 23, wherein said means for determining a relationship between said first and second quantities further comprises means for determining whether said first quantity is equal to said second quantity based, at least in part, on said first and second binary strings.

26. The apparatus of claim 22, wherein said means for determining said relationship between said first and second numerical values further comprises:
   means for subtracting at least a portion of said first binary string from at least a portion of said second binary string; and
   means for determining said relationship based, at least in part, on a result of said subtraction.

27. The apparatus of claim 26, wherein said first character expression represents a first quantity and said second character expression represents a second quantity, and wherein said means for determining said relationship further comprises means for determining whether said first quantity is greater than said second quantity based, at least in part, on said result of said subtraction.

28. The apparatus of claim 26, wherein said result of said subtraction comprises a sign bit.

29. The apparatus of claim 26, wherein said means for subtracting further comprises:
   means for loading a most significant bits portion of said first binary string to a first register comprising a fixed length register;
   means for loading a most significant bits portion of said second binary string to a second register comprising a fixed length register; and
   means for subtracting contents of said first register from contents of said second register.

30. The apparatus of claim 29, and further comprising:
   means for loading a next most significant bits portion of said first binary string to a third register;
   means for loading a next most significant bits portion of said second binary string to a fourth register; and
   means for subtracting contents of said third register from contents of said fourth register.

31. The apparatus of claim 29, and further comprising:
   means for loading a next most significant bits portion of said first binary string to said first register in response to a result of said subtracting said contents of said first register from said contents of said second register;
   means for loading a next most significant bits portion of said second binary string to said second register in response to said result; and
   means for subtracting contents of said third register from contents of said fourth register in response to said result.

32. The apparatus of claim 22, and further comprising means for determining said binary expressions of said characters based, at least in part, on an association of characters and binary expressions.

33. The apparatus of claim 32, wherein said association of characters and binary expressions comprises an association of characters and binary expressions according to ASCII.

34. The apparatus of claim 22, wherein said first and second character expressions comprise first and second character strings that are right justified.

35. The apparatus of claim 34, wherein said first and second character strings are left padded with zeros.

36. The apparatus of claim 22, wherein said binary expressions of said characters comprise eight bit strings selected from a mapping of eight bit strings to characters, said eight bit strings comprising a partial ordering of said strings with respect to an ordering of a sequence of said characters.

37. The apparatus of claim 22, wherein said binary expressions of said characters comprise seven bit strings selected from a mapping of seven bit strings to characters, said seven bit strings comprising a partial ordering of said strings with respect to an ordering of a sequence of said characters.

38. The apparatus of claim 22, wherein said means for determining said relationship further comprises:
means for determining signs of differences between corresponding portions of said first and second binary strings;
means for weighting said signs of differences based, at least in part, on a significance of said corresponding portions of said first and second binary strings; and
means for determining said relationship based, at least in part, on a sum of the weighted signs of differences.

39. The apparatus of claim 38, wherein said means for weighting said signs of differences further comprises:
means for representing said signs of differences as 2's-complement binary expressions in registers; and
means for shifting bits in at least some of said registers.

40. The apparatus of claim 39, wherein said means for shifting bits in at least some of said registers further comprises means for shifting said bits by a number of bit positions based, at least in part, on a significance of differences represented in said registers.

41. The apparatus of claim 40, wherein said significance of differences are based, at least in part, on corresponding bit portions in said first and second binary strings.

42. The apparatus of claim 22, wherein said first and second character expressions comprise first and second alphanumeric character strings.

43. An article comprising:
a non-transitory storage medium comprising machine-readable instructions stored thereon which are executable by a computing platform to:
concatenate binary expressions of individual ones of characters of a first character expression in a first binary string, said characters of said first character expression representing a first numerical value of a first numerical expression represented by a concatenation of said individual ones of characters of said first character expression according to a non-binary position-value notation;
concatenate binary expressions of individual ones of characters of a second character expression in a second binary string, said characters of said second character expression representing a second numerical value of a second numerical expression represented by a concatenation of said individual ones of characters of said second character expression according to said non-binary position-value notation; and
determine a relationship between said first and second numerical values based, at least in part, on said first and second binary strings.

44. The article of claim 43, wherein said first character expression represents a first quantity and said second character expression represents a second quantity, and wherein said machine-readable instructions are further executable by said computing platform to determine a quantitative relationship between said first and second quantities.

45. The article of claim 44, wherein said machine-readable instructions are further executable by said computing platform to determine whether said first quantity is greater than said second quantity based, at least in part, on said first and second binary strings.

46. The article of claim 45, wherein said machine-readable instructions are further executable by said computing platform to determine whether said first quantity is equal to said second quantity based, at least in part, on said first and second binary strings.

47. The article of claim 43, wherein said machine-readable instructions are further executable by said computing platform to:
subtract at least a portion of said first binary string from at least a portion of said second binary string; and
determine said relationship based, at least in part, on a result of said subtraction.

48. The article of claim 47, wherein said first character expression represents a first quantity and said second character expression represents a second quantity, and wherein said machine-readable instructions are further executable by said computing platform to determine whether said first quantity is greater than said second quantity based, at least in part, on said result of said subtraction.

49. The article of claim 47, wherein said result of said subtraction comprises a sign bit.

50. The article of claim 47, wherein said machine-readable instructions are further executable by said computing platform to:
load a most significant bits portion of said first binary string to a first register comprising a fixed length register;
load a most significant bits portion of said second binary string to a second register comprising a fixed length register; and
subtract contents of said first register from contents of said second register.

51. The article of claim 50, wherein said machine-readable instructions are further executable by said computing platform to:
load a next most significant bits portion of said first binary string to a third register;
load a next most significant bits portion of said second binary string to a fourth register; and
subtract contents of said third register from contents of said fourth register.

52. The article of claim 50, wherein said machine-readable instructions are further executable by said computing platform to, in response to a result of said subtracting said contents of said first register from said contents of said second register:
load a next most significant bits portion of said first binary string to said first register;
load a next most significant bits portion of said second binary string to said second register; and
subtract contents of said third register from contents of said fourth register.

53. The article of claim 43, wherein said machine-readable instructions are further executable by said computing platform to determine said binary expressions of said characters based, at least in part, on an association of characters and binary expressions.

54. The article of claim 53, wherein said association of characters and binary expressions comprises an association of characters and binary expressions according to ASCII.

55. The article of claim 43, wherein said first and second character expressions comprise first and second character strings that are right justified.

56. The article of claim 55, wherein said first and second character strings are left padded with zeros.

57. The article of claim 43, wherein said binary expressions of said characters comprise eight bit strings selected from a mapping of eight bit strings to characters, said eight bit strings comprising a partial ordering of said strings with respect to an ordering of a sequence of said characters.

58. The article of claim 43, wherein said binary expressions of said characters comprise seven bit strings selected from a mapping of seven bit strings to characters, said seven bit strings comprising a partial ordering of said strings with respect to an ordering of a sequence of said characters.

59. The article of claim 43, wherein said machine-readable instructions are further executable by said computing platform to:
 determine signs of differences between corresponding portions of said first and second binary strings;
 weight said signs of differences based, at least in part, on a significance of said corresponding portions of said first and second binary strings; and
 determine said relationship based, at least in part, on a sum of the weighted signs of differences.

60. The article of claim 59, wherein said machine-readable instructions are further executable by said computing platform to:
 represent said signs of differences as 2's-complement binary expressions in registers; and
 shift bits in at least some of said registers.

61. The article of claim 60, wherein said machine-readable instructions are further executable by said computing platform to shift said bits by a number of bit positions based, at least in part, on a significance of differences represented in said registers.

62. The article of claim 61, wherein said significance of differences are based, at least in part, on corresponding bit portions in said first and second binary strings.

63. The article of claim 43, wherein said first and second character expressions comprise first and second alphanumeric character strings.

64. An apparatus comprising:
 a computing platform, said computing platform being adapted to:
 concatenate binary expressions of individual ones of characters of a first character expression in a first binary string, said characters of said first character expression representing a first numerical value of a first numerical expression represented by a concatenation of said individual ones of characters of said first character expression according to a non-binary position-value notation;
 concatenate binary expressions of individual ones of characters of a second character expression in a second binary string, said characters of said second character expression representing a numerical value of a second numerical expression represented by a concatenation of said individual ones of characters of said second character expression according to said non-binary position-value notation; and
 determine a relationship between said first and second numerical values based, at least in part, on said first and second binary strings.

65. The apparatus of claim 64, wherein said first character expression represents a first quantity and said second character expression represents a second quantity, and wherein said computing platform is further adapted to determine a quantitative relationship between said first and second quantities.

66. The apparatus of claim 65, wherein said computing platform is further adapted to determine whether said first quantity is greater than said second quantity based, at least in part, on said first and second binary strings.

67. The apparatus of claim 66, wherein said computing platform is further adapted to determine whether said first quantity is equal to said second quantity based, at least in part, on said first and second binary strings.

68. The apparatus of claim 64, wherein said computing platform is further adapted to:
 subtract at least a portion of said first binary string from at least a portion of said second binary string; and
 determine said relationship based, at least in part, on a result of said subtraction.

69. The apparatus of claim 68, wherein said first character expression represents a first quantity and said second character expression represents a second quantity, and wherein said computing platform is further adapted to determine whether said first quantity is greater than said second quantity based, at least in part, on said result of said subtraction.

70. The apparatus of claim 68, wherein said result of said subtraction comprises a sign bit.

71. The apparatus of claim 68, wherein said computing platform is further adapted to:
 load a most significant bits portion of said first binary string to a first register comprising a fixed length register;
 load a most significant bits portion of said second binary string to a second register comprising a fixed length register; and
 subtract contents of said first register from contents of said second register.

72. The apparatus of claim 71, wherein said computing platform is further adapted to:
 load a next most significant bits portion of said first binary string to a third register;
 load a next most significant bits portion of said second binary string to a fourth register; and
 subtract contents of said third register from contents of said fourth register.

73. The apparatus of claim 71, wherein said computing platform is further adapted to, in response to a result of said subtracting said contents of said first register from said contents of said second register:
 load a next most significant bits portion of said first binary string to said first register;
 load a next most significant bits portion of said second binary string to said second register; and
 subtract contents of said third register from contents of said fourth register.

74. The apparatus of claim 64, wherein said computing platform is further adapted to determine said binary expressions of said characters based, at least in part, on an association of characters and binary expressions.

75. The apparatus of claim 64, wherein said association of characters and binary expressions comprises an association of characters and binary expressions according to ASCII.

76. The apparatus of claim 64, wherein said first and second character expressions comprise first and second character strings that are right justified.

77. The apparatus of claim 76, wherein said first and second character strings are left padded with zeros.

78. The apparatus of claim 64, wherein said binary expressions of said characters comprise eight bit strings selected from a mapping of eight bit strings to characters, said eight bit strings comprising a partial ordering of said strings with respect to an ordering of a sequence of said characters.

79. The apparatus of claim 64, wherein said binary expressions of said characters comprise seven bit strings selected from a mapping of seven bit strings to characters, said seven bit strings comprising a partial ordering of said strings with respect to an ordering of a sequence of said characters.

80. The apparatus of claim 64, wherein said computing platform is further adapted to:
 determine signs of differences between corresponding portions of said first and second binary strings;

weight said signs of differences based, at least in part, on a significance of said corresponding portions of said first and second binary strings; and determine said relationship based, at least in part, on a sum of the weighted signs of differences.

81. The apparatus of claim 80, wherein said computing platform is further adapted to:

represent said signs of differences as 2's-complement binary expressions in registers; and shift bits in at least some of said registers.

82. The apparatus of claim 81, wherein said computing platform is further adapted to shift said bits by a number of bit positions based, at least in part, on a significance of differences represented in said registers.

83. The apparatus of claim 82, wherein said significance of differences are based, at least in part, on corresponding bit portions in said first and second binary strings.

84. The apparatus of claim 64, wherein said first and second character expressions comprise first and second alphanumeric character strings.

* * * * *